(12) United States Patent
Foltin et al.

(10) Patent No.: US 11,475,169 B2
(45) Date of Patent: Oct. 18, 2022

(54) SECURITY AND ANOMALY DETECTION FOR INTERNET-OF-THINGS DEVICES

(71) Applicant: Hewlett Packard Enterprise Development LP, Houston, TX (US)

(72) Inventors: Martin Foltin, Ft. Collins, CO (US); Aalap Tripathy, Houston, TX (US); Harvey Edward White, Jr., Houston, TX (US); John Paul Strachan, San Carlos, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 628 days.

(21) Appl. No.: 16/291,094

(22) Filed: Mar. 4, 2019

(65) Prior Publication Data

US 2020/0285779 A1 Sep. 10, 2020

(51) Int. Cl.
*G06F 21/76* (2013.01)
*G06F 21/55* (2013.01)
*H04L 29/06* (2006.01)
*H04L 9/40* (2022.01)

(52) U.S. Cl.
CPC ............ *G06F 21/76* (2013.01); *G06F 21/554* (2013.01); *H04L 63/1425* (2013.01)

(58) Field of Classification Search
CPC ..... H04L 63/1425; H04L 67/28; H04L 67/12; G06F 21/76; G06F 21/554; G06N 3/088; G06N 3/084; G06N 3/063
See application file for complete search history.

(56) References Cited

U.S. PATENT DOCUMENTS

| 7,409,714 | B2 | 5/2008 | Gupta et al. |
| 8,135,657 | B2 | 3/2012 | Kapoor et al. |
| 9,225,793 | B2 | 12/2015 | Dutta et al. |
| 2010/0162399 | A1* | 6/2010 | Sheleheda ........... H04L 63/1416 726/24 |
| 2016/0330225 | A1 | 11/2016 | Kroyzer et al. |
| 2018/0232031 | A1* | 8/2018 | Swierk .................... H04L 67/12 |
| 2018/0253569 | A1* | 9/2018 | Swierk .................... G06F 21/86 |
| 2018/0284735 | A1* | 10/2018 | Cella .................. G05B 19/4184 |
| 2019/0042867 | A1* | 2/2019 | Chen ....................... G06N 3/063 |
| 2019/0171187 | A1* | 6/2019 | Cella ...................... G06N 20/00 |

OTHER PUBLICATIONS

Ahmad et al., "Unsupervised real-time anomaly detection for streaming data", Neurocomputing, vol. 262 (1), 2017, pp. 134-147.

(Continued)

*Primary Examiner* — Joseph P Hirl
*Assistant Examiner* — Thomas A Gyorfi
(74) *Attorney, Agent, or Firm* — Brooks, Cameron & Huebsch, PLLC (57) ABSTRACT

Examples described herein relate to a security system consistent with the disclosure. For instance, the security system may comprise a sensor interface bridge connecting a gateway to an input/output (I/O) card, a Field Programmable Gate Array (FPGA) to scan data to detect an anomaly in the data while the data is in the sensor interface bridge, where a learning neural network accelerator Application-Specific Integrated Circuit (ASIC) is integrated with the FPGA and send the data without an anomaly to the gateway.

19 Claims, 6 Drawing Sheets

(56) References Cited

OTHER PUBLICATIONS

Hawkins et al., "Why Neurons Have Thousands of Synapses, a Theory of Sequence Memory in Neocortex", Frontiers in Neural Circuits, Mar. 30, 2016, pp. 1-13.
Thakur, T. et al., Role of Artificial Intelligence in Intrusion Detection System, Overcoming Securities and Vulnerabilities, (Research Paper), Dec. 1, 2017, 17 Pgs.

* cited by examiner

SECURITY AND ANOMALY DETECTION FOR INTERNET-OF-THINGS DEVICES

BACKGROUND

Internet of Things (IoT) devices are devices that have connectivity functionality. IoT devices may connect to computing devices and other IoT devices to transmit and receive data, IoT devices may participate in transactions of data.

DETAILED DESCRIPTION

Internet of Things (IoT) devices may exchange data between other devices such as computing devices and/or other IoT devices. As used herein, a "device" refers to an article that is adapted for a particular purpose and/or multiple purposes, Examples of devices include sensors, computing devices, IoT enabled devices, industrial IoT (IIoT) enabled devices, etc., which may be included on a virtualized architecture and/or a non-virtualized architecture. As used herein, "IoT enabled devices" include devices embedded with electronics, software, sensors, actuators, and/or network connectivity which enable such devices to connect to a network and/or exchange data. As used herein, "IIoT" enabled devices refer to IoT enabled devices that are used in industrial applications, such as manufacturing or energy management for example. Examples of IoT enabled devices include sensors, vehicles, monitoring devices, devices enabling intelligent shopping systems, manufacturing devices, among other cyber-physical systems. A management server may manage the operation of multiple devices in an environment and/or rely on information from IIoT and/or IoT enabled sensors.

However, the transactions between IoT and/or IIoT enabled devices may be susceptible to malicious attacks depending on the security of the IIoT and/or IoT enabled device sending the data. Further, some IIoT and/or IoT enabled devices do not have a security system to protect data from malicious attacks. Data from IIoT enabled devices without security systems may be compromised by attacks from malicious devices. In addition, it may be difficult to detect when an IoT enabled device will wear out without a monitoring system. Moreover, it may be impractical to incorporate a Neural Network Inference security monitoring system for all IoT enabled devices by moving the IoT enabled devices to edge servers. Accordingly, the security and anomaly detection for internet-of-things devices, as described herein, may use a Field Programmable Gate Array programmed with a learning neural network accelerator logic to detect anomalies in data while the data is in the sensor interface bridge, and send data without an anomaly to a predetermined destination.

Figure 1:
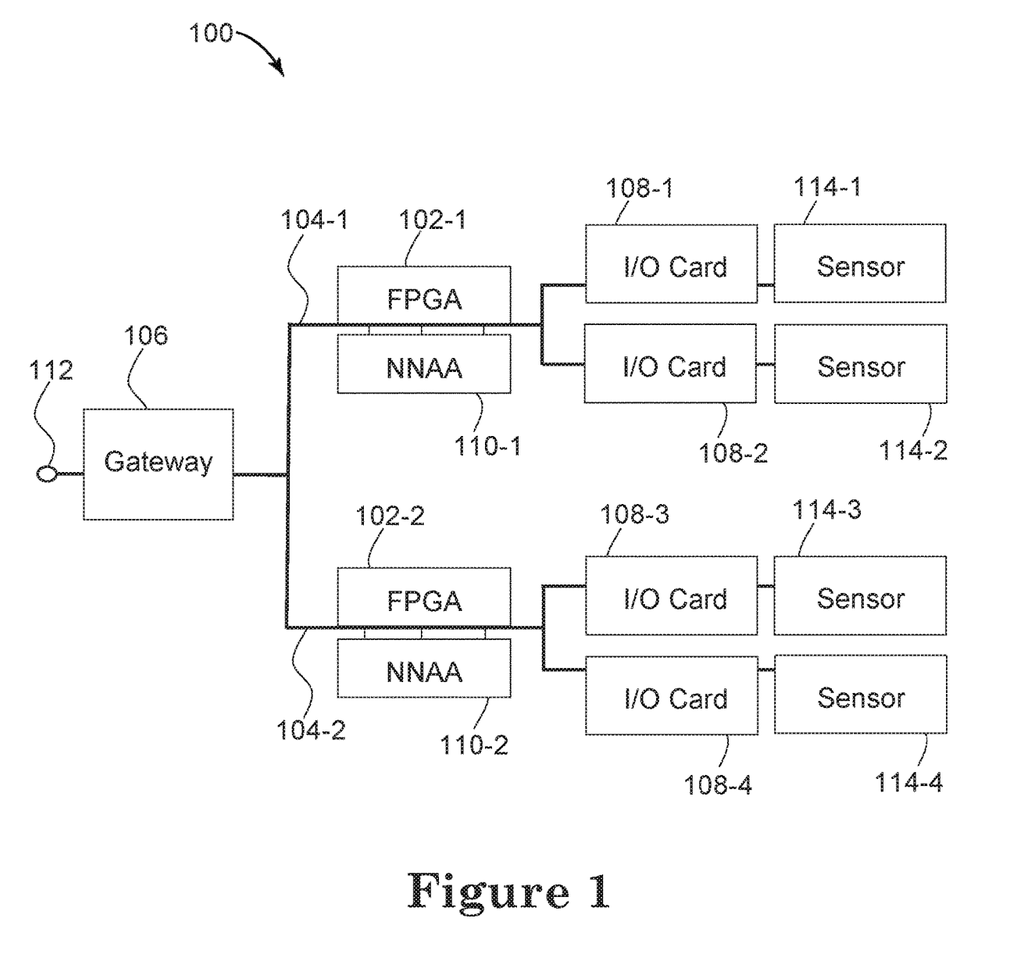
FIG. 1 illustrates an example of a security system consistent with the disclosure.

FIG. 1 illustrates an example of a security system 100 consistent with the disclosure. The security system 100 may include a legacy sensor 114-1 to provide data to the gateway 106. In various examples, the security system 100 may include a plurality of legacy sensors 114-1, 114-2, 114-3, and/or 114-4 (collectively referred to as legacy sensor 114). As used herein, a "legacy sensor" refers to a sensor that does not have an integrated security device to detect malicious attacks.

In some examples, legacy sensor 114 may be connected to input/output (I/O) Cards 108-1, 108-2, 108-3, and/or 108-4 (collectively referred to as I/O card 108). For example, I/O Card 108-1 may be connected to legacy sensor 114-1 and I/O Card 108-2 may be connected to legacy sensor 114-2. The I/O card 108 may be an interface that allows legacy sensor 114 to communicate with other components (e.g., Field Programmable Gate Array, etc.) of the security system 100. The I/O Card 108 may contain the analog-to-digital circuitry or the digital-to-analog circuitry to help transport data from the legacy sensor 114 to other components in the security system 100.

In some examples, the I/O Card 108 may transport data from the legacy sensor 114 to the gateway 106 through the sensor interface bridge 104-1 and/or 104-2 (collectively referred to as sensor interface bridge 104). As used herein, "sensor interface bridge" refers to the path that data sent by a sensor travels to reach a set destination. The sensor interface bridge 104 may connect the gateway 106 to the I/O Card 108 which allows the I/O Card 108 to communicate with the gateway 106. In addition, the sensor interface bridge 104 may allow the I/O Card 108 to transmit data from the legacy sensor 114 to the gateway 106. As used herein, a "gateway" refers to a component that communicatively couples multiple devices, such as a computing device, a printer, a wireless computing device, a switch, IoT device, etc. As used herein, the term "communicatively coupled" refers to a device being coupled directly, indirectly, and/or wirelessly to the gateway such that signals and/or data may be transmitted and/or received. For example, a gateway 106 may be an intelligent gateway, a programmable logic controller, or similar components. As used herein, the term "intelligent gateway" refers to a device or application that serves as a connection point between intelligent devices. As used herein, the term "programmable logic controller" refers to an industrial computing device that has been adapted to work in harsh conditions to control manufacturing processes.

In some examples, as data is transmitted through the sensor interface bridge 104 the data may be scanned by Field Programmable Gate Arrays 102-1 and/or 102-2 (collectively referred to as Field Programmable Gate Array 102). The Field Programmable Gate Array 102 may scan data from a lower Internet of things (IoT) tier device (e.g., legacy sensor 114) to check for anomalies in the data. In some examples, the Field Programmable Gate Array 102 may be integrated with the sensor interface bridge 104. That is, each Field Programmable Gate Array 102 may include a separate sensor interface bridge 104. For instance, the Field Programmable Gate Array 102 and the sensor interface bridge 104 may function as an individual component in the security system 100. As used herein, a "lower IoT tier device" refers to IoT devices that do not have an integrated security device to detect malicious attacks and/or the security device may not be capable of detecting sophisticated attacks on data. As used herein, a "higher IoT tier device" refers to IoT devices that have an integrated security device. In some examples, the Field Programmable Gate Array 102 may function as an inline security monitor that is able to detect anomalies in data before the data reaches the gateway 106 and/or a predetermined destination. As used herein, "inline security" refers to a security system that is inserted into the data path causing the data to pass through the security system. In some examples, the Field Programmable Gate Array 102 may implement common security features such as an embedded Root of Trust (RoT), a trusted platform module (TPM), data encryption, secure boot, and firmware update.

In some examples, the Field Programmable Gate Array 102 may scan data from the legacy sensor 114 while the data pass through the sensor interface bridge 104 to prevent corrupt data from compromising the gateway 106 and/or other connected devices. As used herein, "anomaly" refers to an operation that is unexpected, an operation that may cause damage to a gateway and/or device connected to the gateway, and/or an operation that provides data which is false/inaccurate and/or tampered with. In some examples, the Field Programmable Gate Array 102 may scan the data in a virtualized environment away from gateway controller, data processing, and/or data aggregation allowing access to the data while preventing corrupt data from entering the gateway 106 and/or other connected devices.

In some examples, data may be sent to a higher IoT tier device 112 for a secondary anomaly scan when an anomaly is detected by the Field Programmable Gate Array 102. As used herein, "detecting anomalies" refers to the act of discovering or identifying a threat in the data, an unexpected operation in the data, an operation that may cause damage to a gateway and/or device connected to the gateway, and/or an operation that provides data which is false/inaccurate and/or tampered with. The secondary anomaly scan performed by the higher IoT tier device 112 may provide a more complex scan, as compared to the scan performed by the Field Programmable Gate Array 102, that filters out false positives detected by the Field Programmable Gate Array 102 scan. Performing the secondary scan using a higher IoT tier device 112 on specified data may save the security system 100 time when performing anomaly detection scans by limiting the amount of data that is scanned by the higher IoT tier device 112.

In some examples, when the Field Programmable Gate Array 102 does not detect an anomaly data may be sent to the gateway 106 to be processed by the gateway controller and sent to a predetermined destination, when instructed by the gateway controller. For example, after the Field Programmable Gate Array 102 scans the data for anomalies the gateway controller may send the data to another IoT enabled device, a network server, etc. as a predetermined destination. In various examples, when an anomaly is detected in data by the Field Programmable Gate Array 102, the legacy sensor 114, that send the data, may shut down to prevent corrupt data from compromising the gateway 106 and/or other connected devices. For instance, the legacy sensor 114 that sent the data with anomalies may shut down after an anomaly is detected by a secondary scan performed by the higher IoT tier device 112.

For example, the legacy sensor 114 may be turned off and unable to function when the legacy sensor is shut down. In some examples, the legacy sensor 114 may stop sending data while a secondary scan is being performed when an anomaly is detected in the data. In some examples, the legacy sensor 114 may stop sending data while the Field Programmable Gate Array 102 performs an anomaly scan of the data sent by the legacy sensor 114. For example, the legacy sensor 114 may be functioning but temporarily unable to send data when it stops sending data.

Performing the anomaly detection with the Field Programmable Gate Array 102 inline while the data pass through the sensor interface bridge 104 may prevent malicious, corrupt, and/or anomalous data from entering the gateway 106 and/or other connected devices, thereby creating a secure environment in which data is transmitted while quickly detecting malicious, corrupt, and/or anomalous data. In addition, performing the anomaly detection at the sensor interface bridge 104 allows a legacy sensor 114 to be quickly deactivated, either temporarily or permanently, when an anomaly and/or threat is detected. In some examples, quickly being able to detect anomalies may quickly alert an operator to an IoT device that is not properly functioning.

In some examples, security system 100 may include a plurality of Field Programmable Gate Array 102. Each Field Programmable Gate Arrays 102 may be connected to a plurality of I/O Cards 108. Further, each I/O Card 108 may be connected to a legacy sensor 114. That is, each Field Programmable Gate Arrays may be connected to a plurality of legacy sensors through a plurality of I/O Cards. Each Field Programmable Gate Array 102 may be connected to a separate sensor interface bridge (e.g., sensor interface bridge 104-1 and sensor interface bridge 104-2) connected to the gateway 106.

For example, legacy sensor 114-1 may be connected to I/O card 108-1 which is connected to Field Programmable Gate Arrays 102-1 and legacy sensor 114-2 may be connected to I/O card 108-2 which is connected to Field Programmable Gate Arrays 102-1. Similarly, legacy sensor 114-3 may be connected to I/O card 108-3 which is connected to Field Programmable Gate Arrays 102-2 and legacy sensor 114-4 may be connected to I/O card 108-4 which is connected to Field Programmable Gate Arrays 102-2. Further, Field Programmable Gate Arrays 102-1 and Field Programmable Gate Arrays 102-2 may both be connected to gateway 106 through the sensor interface bridge 104.

In some examples, each Field Programmable Gate Array 102 may communicate with each other, which may allow each Field Programmable Gate Array to detect anomalies based on the learned patterns and/or anomaly interface output associated with the other Field Programmable Gate Array, Connecting each legacy sensor 114 to a Field Programmable Gate Array 102 and then connecting the Field Programmable Gate Array to the gateway 106 through the sensor interface bridge 104 may provide a security environment that is able to connect a large number of legacy sensor 114 and thereby provide a secure system for a large number of legacy sensors 114. As used herein, "anomaly interface output" refers to learned patterns and/or behavior that is determined to be anomalous.

In various examples, the learning neural network accelerator logic (LNNA) may be programmed on the Field Programmable Gate Array 102. In some examples, the learned neural network may be stored in the non-volatile memory of the security system 100. In some examples, the learning neural network accelerator may be implemented on an ASIC creating learning neural network accelerator ASIC (NNAA) 110-1 and/or 110-2 (collectively refer to as NNAA 110). The NNAA may be integrated with the Field Programmable Gate Array 102. In some examples, the learned neural network may be stored on the NNAA 110. The Field Programmable Gate Array 102 may utilize self-learning technology (e.g., Hierarchical Temporal Memory, etc.) to provide real-time anomaly detection at the sensor interface bridge 104.

That is, the LNNA may continuously receive and analyze incoming information and maintain the learned data patterns and/or the anomaly inference outputs in the analog domain. The LNNA may analyze information received from connected IoT enabled devices. In some examples, the LNNA may be able to access the learned data patterns and/or the anomaly inference outputs to allow real-time anomaly detection by the Field Programmable Gate Array 102. In some examples, each Field Programmable Gate Array 102 may communicate with other Field Programmable Gate Array, which may allow each Field Programmable Gate Array 102 to detect anomalies based on the learned data patterns and/or the anomaly inference outputs other Field Programmable Gate Array. For example, the Field Programmable Gate Array 102-1 may use the learned data patterns and/or the anomaly inference outputs stored in NNAA 110-2 by communicating with Field Programmable Gate Array 102-2.

In some examples, the non-volatile memory may employ a memristor, other resistive random-access memory (ReRAM), conductive bridging random-access memory (CBRAM), phase change random-access memory (PCRAM), Flash, or similar technologies to accelerate supervised learning of the LNNA as well as unsupervised learning of the LNNA. As used herein, "supervised learning" refers to a data mining task of inferring a function from labeled training data including an input object and an output value. As used herein, "unsupervised learning" refers to a type of machine learning used to draw inferences from data including input data without an identified output.

In addition, learned patterns and/or anomaly inference outputs may be stored in the non-volatile memory of the security system 100. In some examples, the learned patterns may be stored in NNAA 110. In some examples, storing the learned patterns in the non-volatile memory of the security system 100 or in NNAA 110 may allow the LNNA to be reprogrammed when changes in the characteristics of the data patterns occur. For example, the LNNA or the NNAA 110 may be instructed to de-prioritize prior learned data patterns when changes in the characteristics of the data patterns occur causing the NNAA 110 to learn the new patterns and/or anomaly inference outputs. Allowing the Field Programmable Gate Array 102 to use the learned data patterns to detect anomalies while data passes through the sensor interface bridge 104 may create a low cost inline security system for IoT devices. In addition, the Field Programmable Gate Array 102 may be able to detect anomalies in the data before the data is sent to other locations, for example the higher IoT tier device 112, the gateway, predetermined location, etc. In some examples, detecting data early may prevent anomalous and/or malicious data from being transmitted and/or provide early detection of device failure by alerting an operator to an anomaly early.

Figure 2:
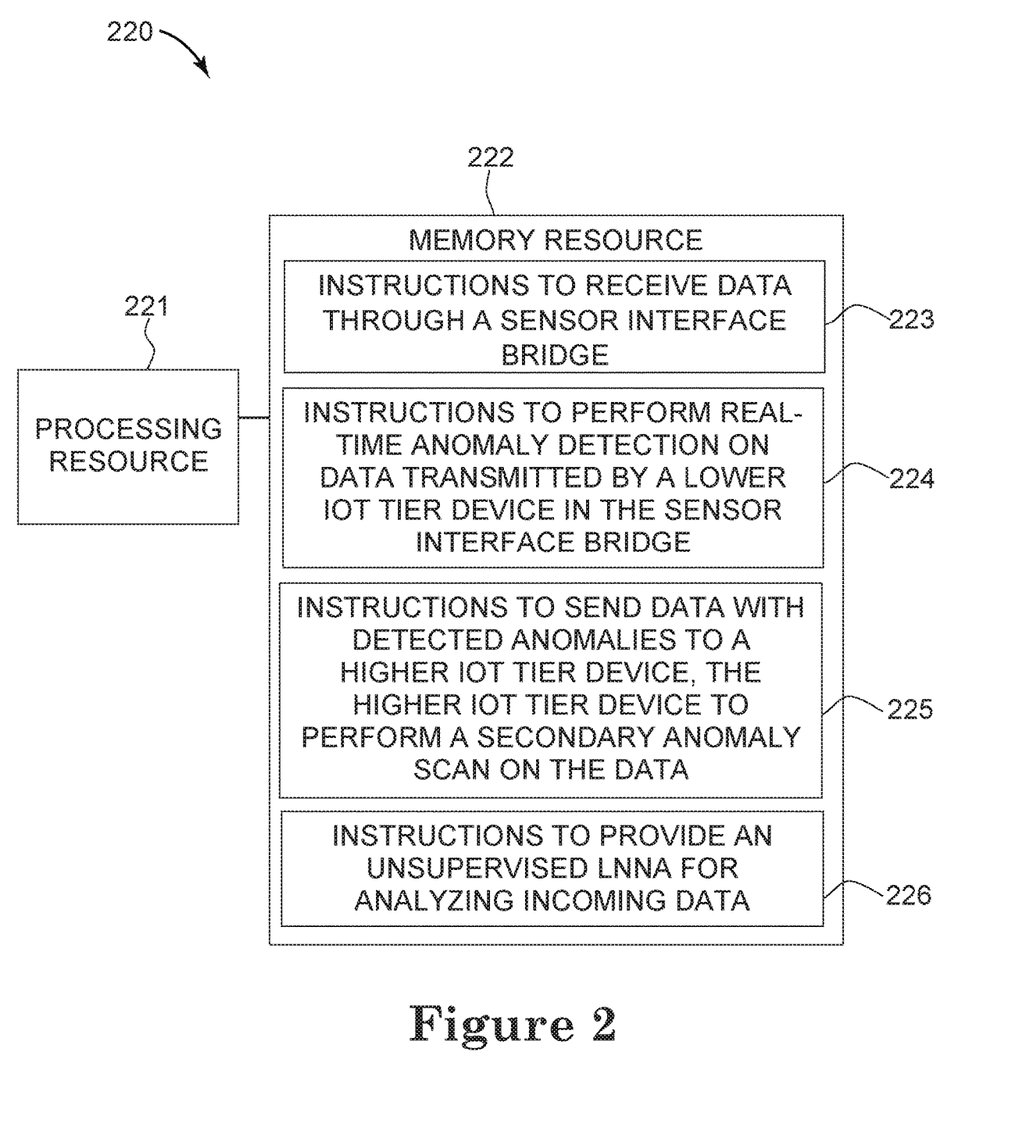
FIG. 2 illustrates an example of an apparatus suitable with a security system consistent with the disclosure.

FIG. 2 illustrates an example of an apparatus 220 suitable with a security system consistent with the disclosure. As illustrated in FIG. 2, the apparatus 220 includes a processing resource 221 and a memory resource 222. The processing resource 221 may be a hardware processing unit such as a microprocessor, application specific instruction set processor, coprocessor, network processor, or similar hardware circuitry that may cause machine-readable instructions to be executed. In some examples, the processing resource 221 may be a plurality of hardware processing units that may cause machine-readable instructions to be executed. The processing resource 221 may include central processing units (CPUs) among other types of processing units. The processing resource 221 may also include dedicated circuits and/or state machines, such as in an Application Specific Integrated Circuit (ASIC), Field Programmable Gate Array (FPGA) or similar design-specific hardware. In some examples, the processing resource 221 may be distributed among a Field Programmable Gate Array or a plurality of Field Programmable Gate Arrays.

The memory resource 222 may be any type of volatile or non-volatile memory or storage, such as random-access memory (RAM), flash memory, read-only memory (ROM), storage volumes, a hard disk, or a combination thereof. The memory resource 222 may be a plurality of hardware memory units that may be interfaced to corresponding hardware processing units. The memory resource 222 may store instructions thereon, such as instructions 223, 224, 225, and 226. When executed by the processing resource 221, the instructions may cause the apparatus 220 to perform specific tasks and/or functions. For example, the memory resource 222 may store instructions 223 which may be executed by the processing resource 221 to cause the apparatus 220 to receive data through a sensor interface bridge. In some examples, data may be sent from a legacy sensor to the gateway for processing through the sensor interface bridge. Data may travel to the Field Programmable Gate Array for anomaly detection before reaching the gateway. That is, the data may be scanned in the sensor interface bridge to ensure that the data does not corrupt the gateway and/or other devices connected to the gateway.

The memory resource 222 may store instructions 224 which may be executed by the processing resource 221 to cause the apparatus 220 to perform real-time anomaly detection on data transmitted by a lower IoT tier device in the sensor interface bridge. Legacy sensors may be more susceptible to malicious attacks as they may not have an integrated security system to detect anomalies and/or threats. In some examples, integrating the Field Programmable Gate Array into a sensor interface bridge may incorporate a security system into the data stream, which creates a secure environment for legacy sensors that do not have an integrated security system. In some examples, the Field Programmable Gate Array may access learned data patterns stored in the non-volatile memory or NNAA to detect anomalies in data sent by lower IoT tier device, legacy sensors for example. In some examples, the Field Programmable Gate Array may utilize anomaly inference outputs produced by the NNAA, to detect anomalies in the sent data.

The memory resource 222 may store instructions 225 which may be executed by the processing resource 221 to cause the apparatus 220 to send data with detected anomalies to a higher IoT tier device, the higher IoT tier device to perform a secondary anomaly scan on the data. Stated differently, in some examples, the gateway sends the data to a higher IoT tier device for a secondary scan responsive to the Field Programmable Gate Array detecting an anomaly in the data. The secondary scan may be a more complex scan, as compared to the scan performed by the Field Programmable Gate Array. Further, the secondary scan may be able to catch threats missed by the prior scan as well as eliminate any false positives detected by the prior scan.

The memory resource 222 may store instructions 226 which may be executed by the processing resource 221 to cause the apparatus 220 to provide an unsupervised learning neural network accelerator logic programmed to the processing resource for analyzing incoming information for to allow the real-time anomaly detection. In some examples, the LNNA may be able to analyze incoming information and learn data patterns that may assist the Field Programmable Gate Array is detecting anomalies. That is, the LNNA may be able to continuously or near continuously learn and update as new data patterns are learned. The data patterns and/or the anomaly inference outputs may then be used by the Field Programmable Gate Array to detect anomalies, thereby creating a security environment that is able to detect ever changing security threats. As used herein, "near continuously" intends that the characteristic does not have to be absolutely continuous but is close enough so as to achieve the characteristic continuous.

Figure 3:
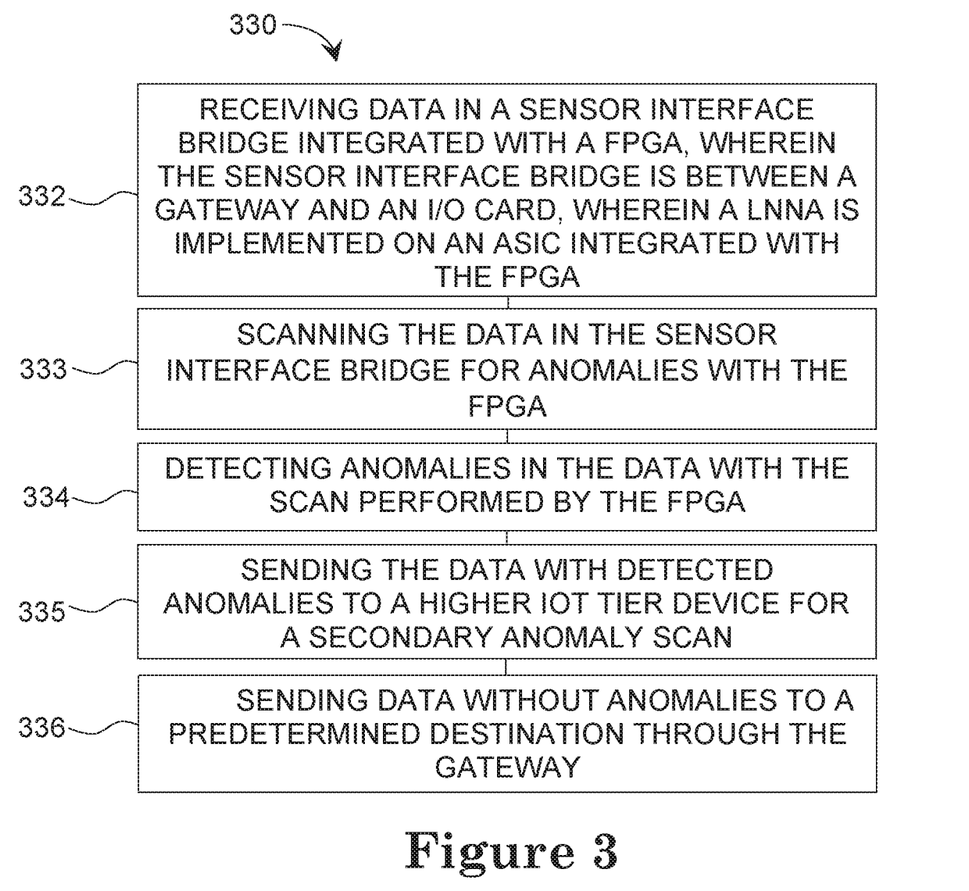
FIG. 3 illustrates an example of a method consistent with the disclosure.

FIG. 3 illustrates an example of a method 330 consistent with the disclosure. Method 330 may be performed, for example, by a processing resource (e.g., processing resource 221 of FIG. 2) of apparatus (e.g., apparatus 220 of FIG. 2). The method 330 may be performed with more or less elements.

At 332, the method 330 may include receiving data in a sensor interface bridge integrated with a Field Programmable Gate Array (FPGA), wherein the sensor interface bridge is between a gateway and an I/O card, wherein a learning neural network accelerator is implemented on an Application-Specific Integrated Circuit (ASIC) integrated with the FPGA. In some examples, the sensor interface bridge may create a path for data to transmitted from an I/O card to the gateway. For instance, the I/O card may transmit data from a legacy sensor to a gateway through a sensor interface bridge. In some examples, data may be scanned for anomalies by a Field Programmable Gate Array before reaching the gateway.

At 333, the method 330 may include scanning the data for anomalies with the Field Programmable Gate Array. In some examples, when an anomaly is detected the Field Programmable Gate Array may cause the gateway to send the data to a higher IoT tier device for a secondary scan. Sending the data to the higher IoT tier device for a secondary scan may ensure that malicious data does not corrupt devices connected to the gateway.

At 334, the method 330 may include detecting anomalies in the data with the scan performed by the Field Programmable Gate Array. In some examples, having the Field Programmable Gate Array integrated into the sensor interface bridge between the gateway and the I/O card may provide a secure environment for transmitting data. That is, the Field Programmable Gate Array may be able to scan the data for anomalies and/or threats before the data reaches the gateway. The Field Programmable Gate Array may access data patterns and/or the anomaly inference outputs, to determine which characteristics of the data may be harmful.

At 335, the method 330 may include sending data with detected anomalies to a higher IoT tier device for a secondary anomaly scan. Sending data to a higher IoT for a secondary scan provides an added security measure to the legacy sensor.

At 336, the method 330 may include sending data without anomalies to a predetermined destination through the gateway. The Field Programmable Gate Array may allow the data to enter the gateway and proceed to its predetermined destination when an anomaly is not detected. Likewise, when the data is sent to a higher IoT tier device for a secondary scan and an anomaly is not detected the data is sent to its predetermined destination through the gateway.

Figure 4:
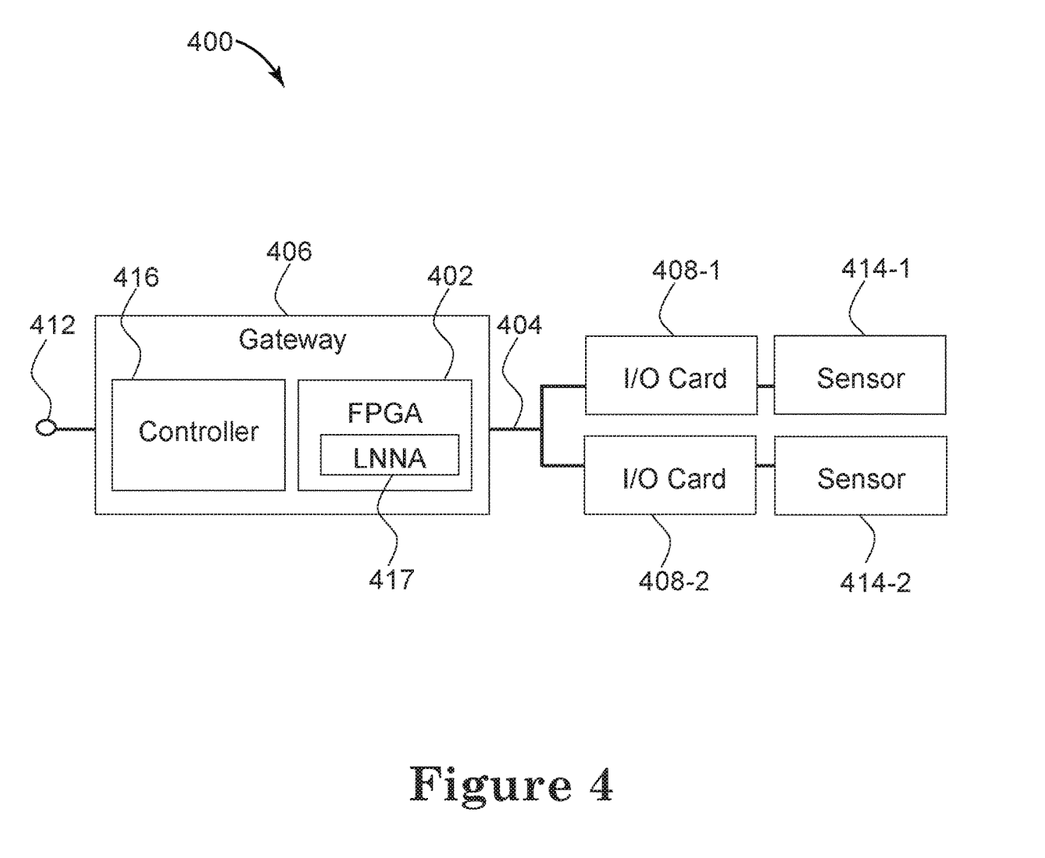
FIG. 4 illustrates an example of a security system consistent with the disclosure.

FIG. 4 illustrates an example of a security system 400 consistent with the disclosure. Security system 400 is analogous or similar to security system 100 of FIG. 1. Legacy sensor 414 is analogous or similar to legacy sensor 114 of FIG. 1. I/O card 408 is analogous or similar to I/O card 108 of FIG. 1. Sensor interface bridge 404 is analogous or similar to sensor interface bridge 104 of FIG. 1. Field Programmable Gate Array 402 is analogous or similar to Field Programmable Gate Array 102 of FIG. 1. Higher IoT tier device 412 is analogous or similar to higher IoT tier device 112 of FIG. 1. Gateway 406 is analogous or similar to gateway 106 of FIG. 1.

The security system 400 may include legacy sensors 414-1 and/or 414-2 (collectively refer to as legacy sensor 414) and an I/O cards 408-1 and/or 408-2 (collectively refer to as I/O card 408). In some examples, the I/O card 408 may use a sensor interface bridge 404 to transmit data from the legacy sensor 414 to the gateway 406. The Field Programmable Gate Array 402 may scan data for anomalies as the I/O card 408 transmit the data to the gateway. That is, the Field Programmable Gate Array 402 may scan data from a lower IoT tier device to detect anomalies in the data.

In some examples, the Field Programmable Gate Array 402 may be integrated into the sensor interface bridge 404 between the I/O card 408 and the gateway 406 to provide a low cost inline security system. The Field Programmable Gate Array 402 may be programmed with a LNNA 417. The LNNA may use learned data patterns analyzed by the LNNA 417 to provide real-time anomaly detection. In some examples, LNNA 417 may use supervised and unsupervised learning to obtain data patterns. In some examples, the LNNA 417 may be implemented on an ASIC which may be integrated into a Field Programmable Gate Array 402. The Field Programmable Gate Array 402 may be able to detect anomalies in the data before the data is sent to other locations. In some examples, detecting data early may prevent malicious data from being transmitted and/or provide early detection of device failure.

In some examples, as illustrated in FIG. 4, the Field Programmable Gate Array 402 may be integrated in to the gateway 406. The Field Programmable Gate Array 402 is able to perform real-time anomaly detection in the sensor interface bridge while being integrated into the gateway 406. That is, the Field Programmable Gate Array 402 may detect anomalies in data before the controller 416 of the gateway 406 allows the data to reach its predetermined destination. In some examples, when the Field Programmable Gate Array 402 detects an anomaly the data may be sent to a higher IoT tier device 412 for a secondary scan for anomalies. In contrast, when an anomaly is not detected the controller 416 may send the data to its predetermined destination. In some examples, the controller 416 may be integrated into the Field Programmable Gate Array 402, In some examples, the Field Programmable Gate Array 402, the controller 416, and a NNAA may be integrated into an individual component.

Figure 5:
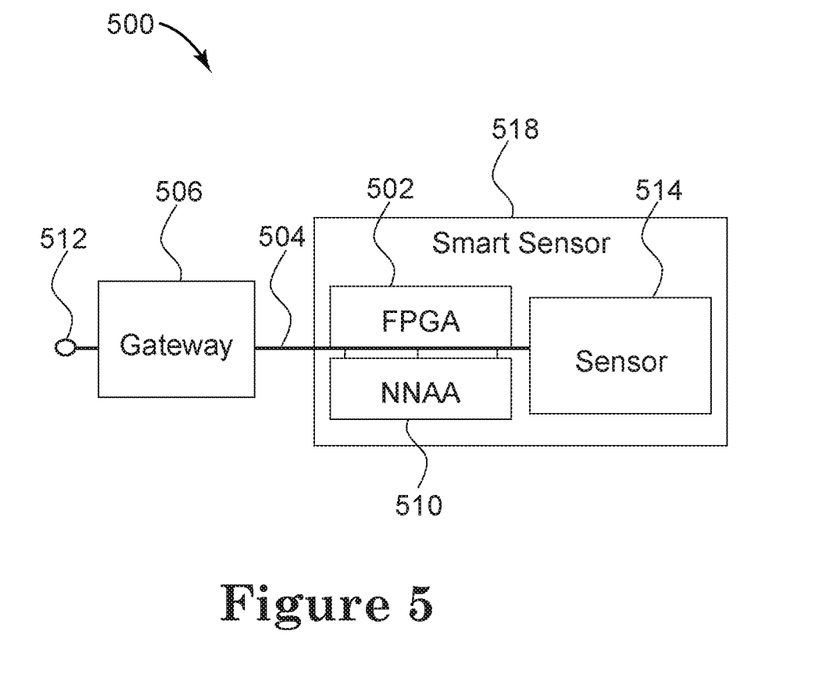
FIG. 5 illustrates an example of a security system consistent with the disclosure.

FIG. 5 illustrates an example of a security system 500 consistent with the disclosure. Security system 500 is analogous or similar to security system 100 and 400 of FIGS. 1 and 4, respectively. Legacy sensor 514 is analogous or similar to legacy sensor 114 and 414 of FIGS. 1 and 4, respectively. Sensor interface bridge 504 is analogous or similar to sensor interface bridge 104 and 404 of FIGS. 1 and 4, respectively. Field Programmable Gate Array 502 is analogous or similar to Field Programmable Gate Array 102 and 402 of FIGS. 1 and 4, respectively. Higher IoT tier device 512 is analogous or similar to higher IoT tier device 112 and 412 of FIGS. 1 and 4, respectively. Neural network accelerator ASIC 510 is analogous or similar to Neural network accelerator ASIC 110 of FIG. 1, Gateway 506 is analogous or similar to gateway 106 and 406 of FIGS. 1 and 4, respectively.

In some examples, as illustrated in FIG. 5, the Field Programmable Gate Array 502 may be integrated with the legacy sensor 514 to produce a smart sensor 518, The Field Programmable Gate Array 502 may be able to perform real-time anomaly detection in the sensor interface bridge while being integrated with the legacy sensor 514. That is, the legacy sensor may send data to the Field Programmable Gate Array 502 to be scanned for anomalies before the data is sent to the I/O card, thereby producing a smart sensor 518. Further, the smart sensor 518 may detect anomalies in data, using the Field Programmable Gate Array 502, before data is sent to the gateway 506.

In some examples, when the smart sensor 518 including the Field Programmable Gate Array 502 detects an anomaly the data may be sent to the higher IoT tier device 512 for a secondary scan for anomalies through the gateway 506. In contrast, when an anomaly is not detected the smart sensor 518 may be processed to the predetermined destination through the gateway 506.

Figure 6:
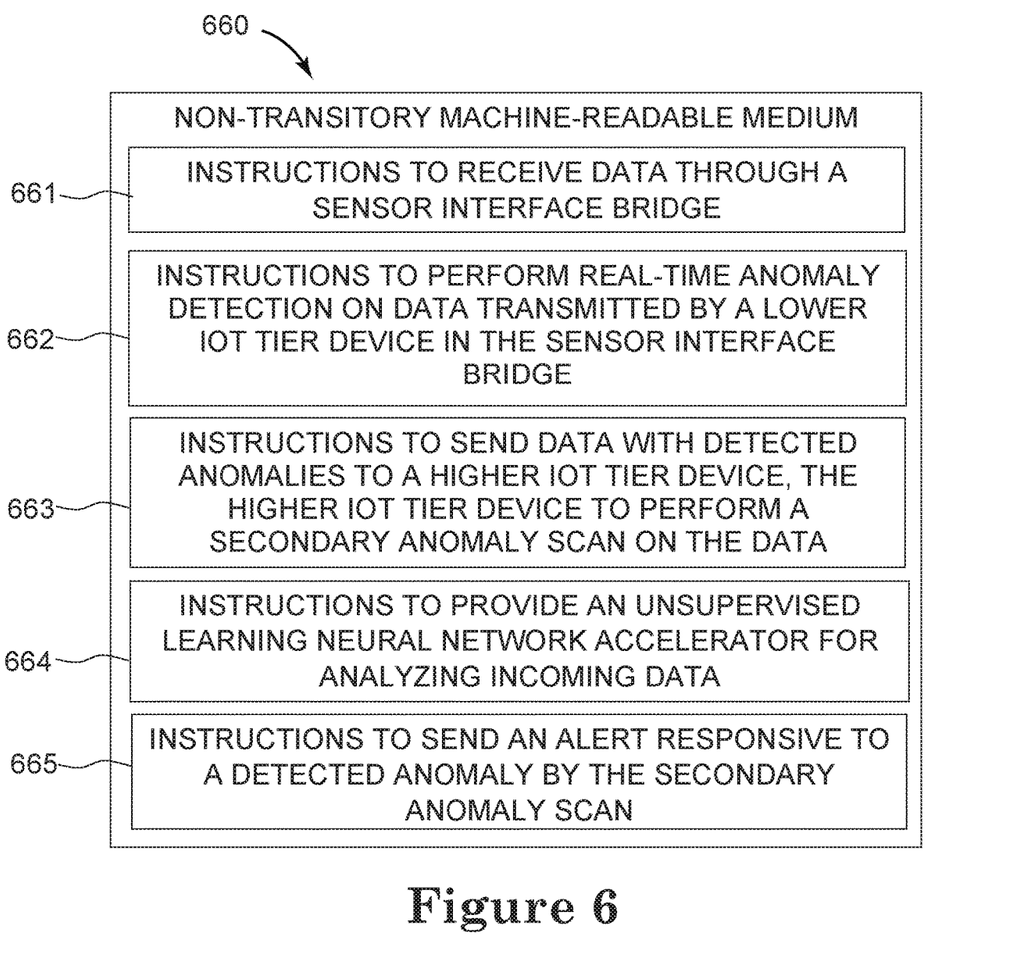
FIG. 6 illustrates an example diagram of a non-transitory machine readable medium suitable with a system consistent with the disclosure.

FIG. 6 illustrates an example diagram of a non-transitory machine readable medium 660 suitable with a system consistent with the disclosure. The non-transitory machine-readable medium 660 may be any type of volatile or non-volatile memory or storage, such as random-access memory (RAM), flash memory, read-only memory (ROM), storage volumes, a hard disk, or a combination thereof.

The medium 660 stores instructions 661 executable by a processing resource to receive data through a sensor interface bridge. In some examples, scanning data for threats in the sensor interface bridge creates the ability to respond to detected anomalies and/or threats before the data reaches its predetermined destination or is decrypted. In some examples, detecting threats before the data reaches the gateway may allow data to be transmitted securely from lower IoT tier devices.

The medium 660 stores instructions 662 executable by a processing resource to perform real-time anomaly detection on data transmitted by a lower IoT tier device in the sensor interface bridge. In some examples, the Field Programmable Gate Array may perform anomaly detection on data as it is transmitted through the sensor interface bridge. The Field Programmable Gate Array may perform real-time anomaly detection using data patterns obtained by the LNNA.

The medium 660 stores instructions 663 executable by a processing resource to send data with detected anomalies to a higher IoT tier device, the higher IoT tier device to perform a secondary anomaly scan on the data. In some examples, when an anomaly is detected by the Field Programmable Gate Array a secondary scan may occur. In some examples, the legacy sensor that sent the data may stop sending data while a secondary scan is being performed. In various examples, when an anomaly in sent data is detected by the secondary scan the legacy sensor that sent the data may shut down to prevent corrupt data from compromising other connected devices connected to the gateway.

The medium 660 stores instructions 664 executable by a processing resource to provide an unsupervised learning neural network accelerator logic programmed to the processing resource for analyzing incoming information for to allow the real-time anomaly detection. The medium 660 may use unsupervised learning to analyze data and learn characteristics in data that may threaten other connected devices and components in the sensor interface bridge. In some examples, the NNAA integrated with the Field Programmable Gate Array may detect anomalies using the supervised learning of the LNNA.

The medium 660 stores instructions 665 executable by a processing resource to send an alert responsive to a detected anomaly by the secondary anomaly scan. In some examples, after an anomaly in sent data is detected an alert may be sent to shut down the legacy sensor that sent the data to prevent other corrupt data from being transmitted. Shutting down the legacy sensor may prevent corrupt data from other connected devices. In some examples, an alert may be sent to notify an operator that an IoT device is not functioning properly or that the IoT device is wearing out. That is, the alert may signal an operator to perform maintenance on the IoT device and/or bring attention the device imminent failure.

The figures herein follow a numbering convention in which the first digit corresponds to the drawing figure number and the remaining digits identify an element or component in the drawing, Elements shown in the various figures herein may be capable of being added, exchanged, and/or eliminated so as to provide a number of additional examples of the disclosure. In addition, the proportion and the relative scale of the elements provided in the figures are intended to illustrate the examples of the disclosure and should not be taken in a limiting sense. It should be understood that the descriptions of various examples may not be drawn to scale and thus, the descriptions may have a different size and/or configuration other than as shown therein.

What is claimed:

1. A security system comprising:
   a sensor interface bridge connecting a gateway to an input/output (I/O) card;
   a Field Programmable Gate Array (FPGA) to:
   scan data to detect an anomaly in the data while the data is in the sensor interface bridge, wherein a learning neural network accelerator Application-Specific Integrated Circuit (ASIC) is integrated with the FPGA; and
   send the data without an anomaly to the gateway,
   wherein the FPGA is to send the data with detected anomalies to a higher internet of things (IoT) tier device for a secondary anomaly scan.

2. The security system of claim 1, wherein a sensor sending data is to stop sending data while the secondary anomaly scan is performed responsive to the FPGA detecting the anomaly.

3. The security system of claim 1, wherein a sensor sending data is to shut down responsive to the secondary anomaly scan detecting the anomaly in the sent data.

4. The security system of claim 1, wherein a sensor is integrated with the FPGA.

5. The security system of claim 1, wherein the FPGA is to connect the gateway to a plurality of sensors.

6. The security system of claim 5, wherein the FPGA is connected to a plurality of I/O cards.

7. The security system of claim 6, wherein each I/O card of the plurality of I/O cards are connected to a sensor of the plurality of sensors.

8. The security system of claim 5, further comprising a plurality of FPGA, wherein the FPGA communicates with a second FPGA to access the learning neural network accelerator ASIC of the second FPGA.

9. The security system of claim 1, wherein the gateway is an intelligent gateway.

10. The security system of claim 1, wherein the gateway is a programmable logic controller (PLC).

11. A non-transitory machine-readable medium storing instructions executable by a processing resource to:

receive data transmitted by a lower internet of things (loT) tier device through a sensor interface bridge;

perform real-time anomaly detection on the data transmitted by the lower loT tier device in the sensor interface bridge;

send the data with detected anomalies to a higher loT tier device, the higher loT tier device to perform a secondary anomaly scan on the data; and provide an unsupervised learning neural network accelerator logic programmed to the processing resource for analyzing incoming information to allow the real-time anomaly detection.

12. The non-transitory machine-readable medium of claim 11, further including instructions to send an alert responsive to a detected anomaly in the data by the secondary anomaly scan.

13. The non-transitory machine-readable medium of claim 11, wherein the unsupervised learning neural network accelerator logic programmed to the processing resource uses self-learning to provide real-time anomaly detection.

14. The non-transitory machine-readable medium of claim 13, wherein the processing resource is a Field Programmable Gate Array (FPGA).

15. A method comprising:

receiving data in a sensor interface bridge integrated with a Field Programmable Gate Array (FPGA), wherein the sensor interface bridge is between a gateway and an input/output (I/O) card, wherein a learning neural network accelerator is implemented on an Application-Specific Integrated Circuit (ASIC) integrated with the FPGA;

scanning the data in the sensor interface bridge for anomalies with the FPGA;

detecting anomalies in the data with the scan performed by the FPGA; and sending the data with detected anomalies to a higher internet of things (loT) tier device for a secondary anomaly scan.

16. The method of claim 15, further comprising sending data without anomalies to a predetermined destination through the gateway.

17. The method of claim 15, further comprising providing a supervised learning neural network accelerator for analyzing incoming information to allow the real-time anomaly detection.

18. The method of claim 15, further comprising integrating the FPGA into the gateway.

19. The method of claim 15, further comprising integrating a gateway controller into the FPGA.

* * * * *